Sept. 15, 1953      A. H. LAIDIG ET AL      2,652,483
ARCUATE DISCHARGE LAMP AND SOCKET
Filed April 19, 1948      3 Sheets-Sheet 1
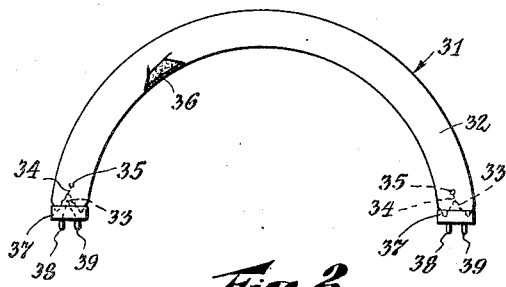
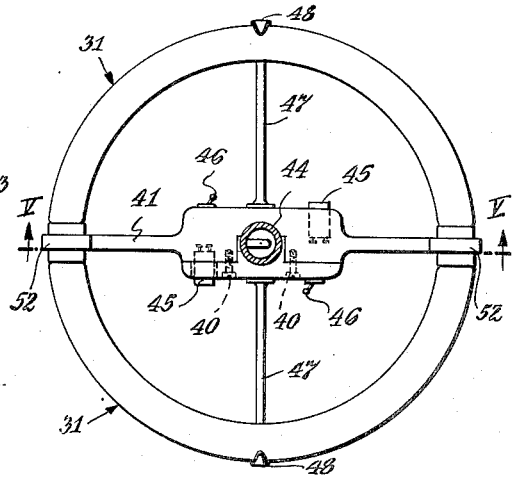
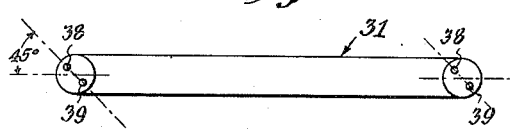
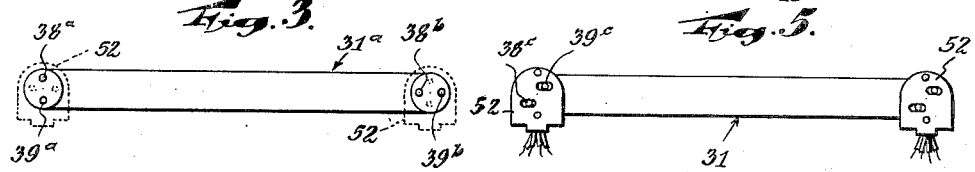
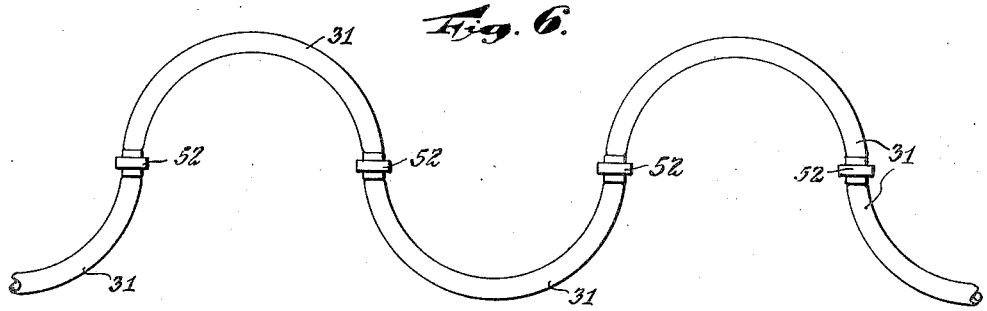
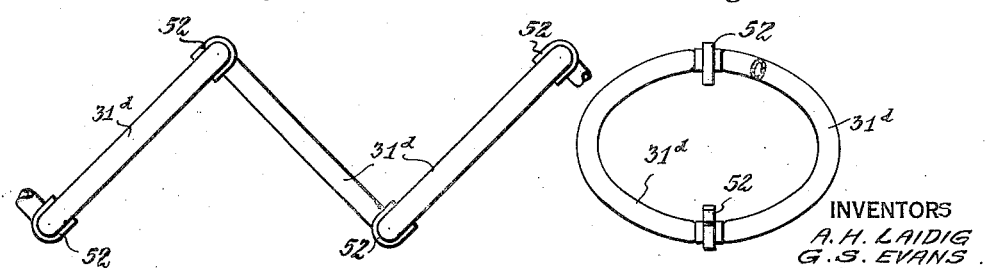
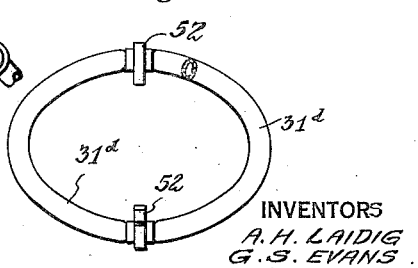
INVENTORS
A. H. LAIDIG
G. S. EVANS
BY
ATTORNEY

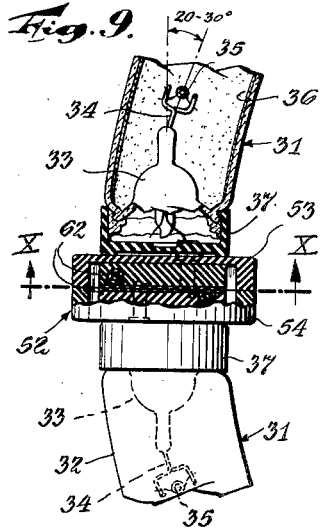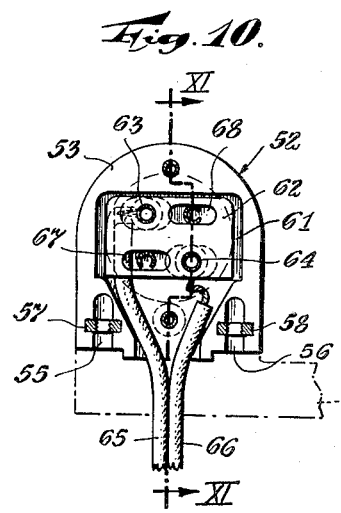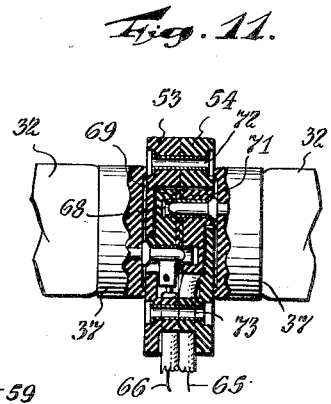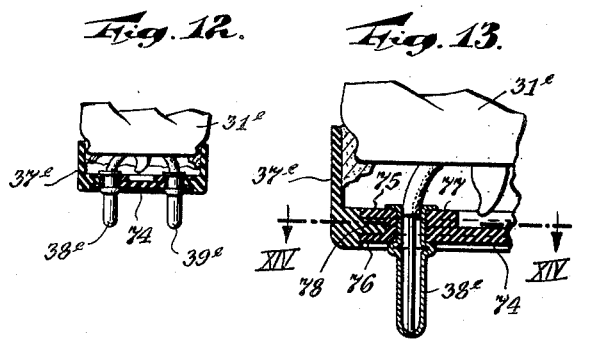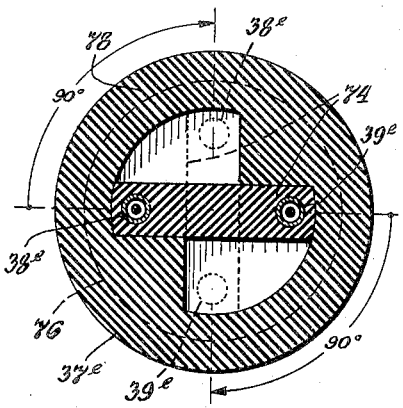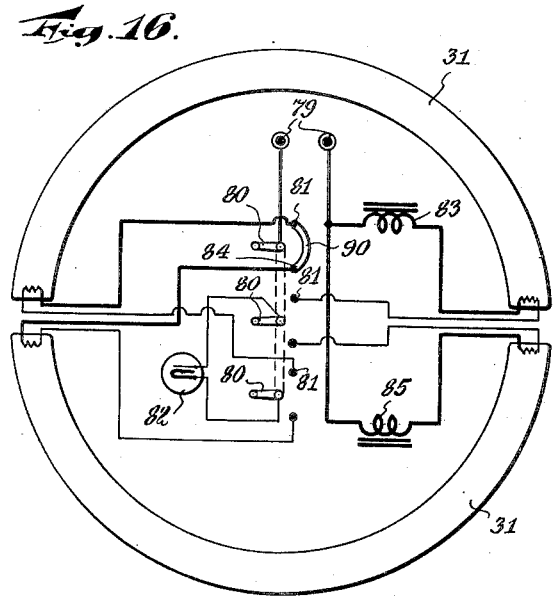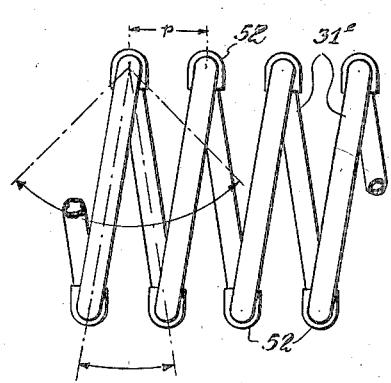

Sept. 15, 1953  A. H. LAIDIG ET AL  2,652,483
ARCUATE DISCHARGE LAMP AND SOCKET
Filed April 19, 1948

INVENTORS
A. H. LAIDIG
G. S. EVANS.
BY
ATTORNEY

Patented Sept. 15, 1953

2,652,483

UNITED STATES PATENT OFFICE 2,652,483

ARCUATE DISCHARGE LAMP AND SOCKET

Alfred H. Laidig, Bloomfield, and George S. Evans, Montclair, N. J., assignors to Westinghouse Electric Corporation, East Pittsburgh, Pa., a corporation of Pennsylvania Application April 19, 1948, Serial No. 21,966

15 Claims. (Cl. 240—51.12)

1

This invention relates to discharge lamps, more particularly to those of the fluorescent type, in which the envelopes are arcuate or semi-circular, and sockets therefor.

The principal object of our invention, generally considered, is to provide an approximately semi-circular discharge lamp, especially one of the fluorescent type, with a simple base at each end, and adapted to be constructed generally like a lamp with a straight tubular envelope, but so that a plurality of lamps may be combined to form a complete circle, as an improvement over such lamps of the circular type.

Another object of our invention is to manufacture lamps of the arcuate discharge or fluorescent type, by positioning the bases thereof so that when a pair of said lamps are assembled the pins overlap rather than engage one another, thereby making it possible to use a socket between adjacent ends of associated lamps which is only slightly thicker than the length of a pin, thus keeping the proportionate length of the effective lighting portion at a maximum.

A further object of our invention is to provide a supporting device or socket for arcuate or approximately semi-circular discharge lamps, especially those of the fluorescent type, which receives pins projecting from opposite ends of such lamps and transmits power to said lamps through said pins, said device being formed to hold auxiliary devices such as starting or glow relays and switches, and forming when completely assembled an approximately circular light source.

A still further object of our invention is to provide arcuate discharge lamps, especially of the fluorescent type, provided with button-headed contact pins at their ends which may serve, not only to deliver power to each lamp, but lock it to an associated supporting socket.

Other objects and advantages will become apparent as the description proceeds.

Referring to the drawing—

Figure 1 is a plan, with parts in section, of an arcuate approximately semi-circular fluorescent lamp embodying our invention.

Figure 2 is an elevational view of the lamp of Figure 1.

Figure 3 is a view corresponding to Figure 2, but showing a modification.

Figure 4 is a plan of a pair of lamps, such as shown in Figure 1, supported on an associated fixture comprising sockets and auxiliaries.

Figure 5 is a vertical sectional view on the line V—V of Figure 4, in the direction of the arrows.

Figure 6 is a plan of a series of lamps, such as

2 shown in Figure 1 or in Figure 3, connected to provide an approximately sinusoidal lighting arrangement.

Figure 7 is an elevational view of a series of lamps, such as shown in Figure 3, connected to provide a generally helical light-giving source.

Figure 8 is an axial view of the arrangement shown in Figure 7.

Figure 9 is a detail plan, with parts in horizontal section, of adjacent ends of a pair of lamps with an associated connecting socket therebetween.

Figure 10 is a transverse sectional view on the line X—X of Figure 9, in the direction of the arrows.

Figure 11 is a vertical sectional view on the line XI—XI of Figure 10, in the direction of the arrows, parts being shown in elevation.

Figure 12 is an axial sectional view with parts in elevation of a modified form of base applied to a lamp embodying our invention.

Figure 13 is a fragmentary view, corresponding to Figure 12 but on an enlarged scale, showing a contact pin in axial section.

Figure 14 is a transverse sectional view on the line XIV—XIV of Figure 13, in the direction of the arrows.

Figure 15 shows in elevation a series of lamps, of the type shown in Figures 12, 13, and 14, arranged as a helical light-giving source of smaller pitch than that of Figure 7.

Figure 16 is a wiring diagram, indicating how a pair of lamps embodying our invention may be operated.

Figure 17:
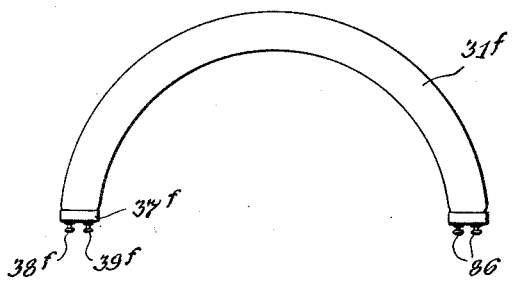

Figure 17 is a view corresponding to Figure 1, but showing a modification.

Figure 18:
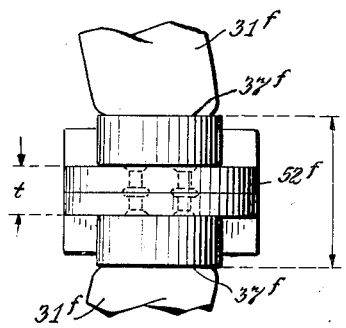

Figure 18 is a plan of the adjacent ends of lamps, such as shown in Figure 17, and a modified form of socket therebetween.

Figure 19:
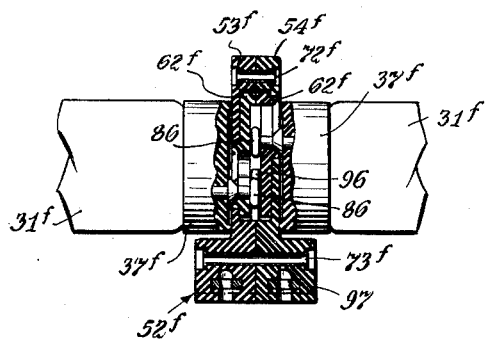
Figure 20:
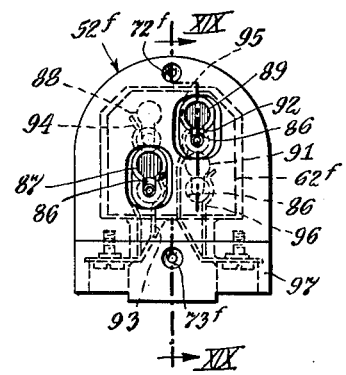

Figure 19 is a vertical sectional view on the line XIX—XIX of Figure 20, with parts in elevation.

Figure 20 is an elevational view of the socket of Figures 18 and 19.

Figure 21:
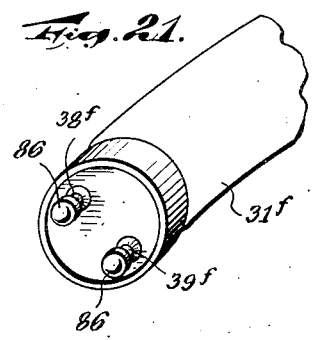

Figure 21 is a perspective view of the one end portion of the lamp of Figure 17.

Figure 22:
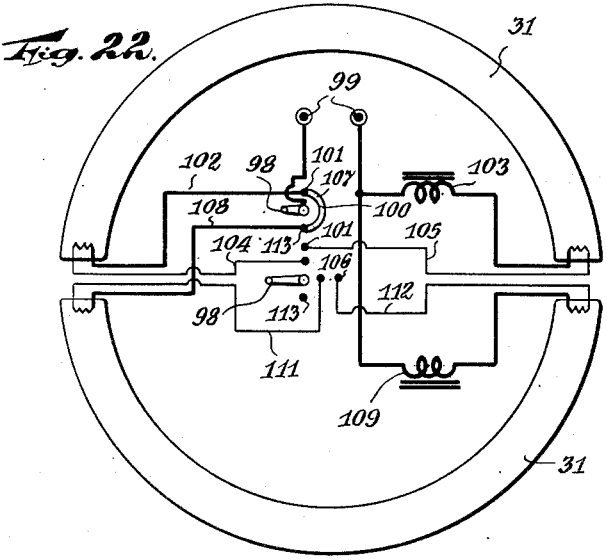

Figure 22 is a wiring diagram, as a modification of that of Figure 16.

The present circular lamp presents a number of problems for a lamp manufacturer as well as for the fixture manufacturer. We propose to simplify these problems by employing a plurality of arcuate, or a pair of approximately semi-circular lamps, using for example two semi-circular lamps in place of each circular lamp.

We propose that the output would be changed to the least extent and the length of the lighted tubing would be as great as possible in order to maintain a high light output. The idea is to adapt the present simple base, such as used on discharge lamps of the straight fluorescent type, thereby eliminating radically different bases and methods of manufacture and assembly, accomplishing the results desired by the circular lamp in a cheaper and better manner, by placing the bases of the arcuate or semi-circular lamps in such a way that the contact pins of one lamp overlap the adjacent contact pins of an associated lamp.

Referring to the drawing in detail, like parts being designated by like reference characters, and first considering the embodiment of Figures 1 and 2, there is shown a lamp 31 comprising an elongated tubular envelope 32 bent to approximately semi-circular shape, that is with its axis generally semi-circular in plan. Each end of the envelope 32 has a mount 33, which may be of conventional type except that the support wires 34 for the conventional electron-emitting filament 32 are bent in the direction in which the axis of the envelope is curved, or as most clearly illustrated in the enlarged view of Figure 9, at an angle of between 20° and 30° to the axis of the mount, so that the filament is more nearly centered in the curved envelope.

Although we have indicated fluorescent material 36 on the inside of the envelope, it will be understood that our invention is not limited to fluorescent lamps, but may apply to those in which the envelope is clear or merely frosted. That is, the invention may apply to a mere discharge lamp, although it is particularly adapted to fluorescent lamps.

Each end of each lamp has a base 37 applied thereto, said bases in the present embodiment each having contact pins 38 and 39 projecting generally axially therefrom, with the plane of each pair of pins making an angle, such as 45°, with the plane of the arcuate lamp axis. This means that in the present embodiment the plane of the axes of the pins at one end of the lamp 31 is parallel to the plane of the axes of the pins at the other end of the lamp. However, the plane of the pins at one end is tangent to a cone, having its axis corresponding with that of the lamp, that is, passing through the center and perpendicular to the plane of the circle which, in turn, passes centrally through the curved lamp envelope, different from the corresponding cone to which the plane of the pins at the other end is tangent. Thus the cones are here inverted with respect to one another. The purpose of this is to cause the pins of one lamp to overlap, rather than engage, the pins of an associated lamp, when assembled therewith as shown, for example, in Figure 4.

Figure 3 shows a lamp 31ª, like the lamp 31 of the preceding embodiment, except that the pins 38ª and 39ª at one end are in a plane perpendicular to the plane of the lamp axis, while the pins 38ᵇ and 39ᵇ at the other end of the lamp are in the plane of the lamp axis, thereby accomplishing the same general purpose when assembled with sockets 52 as the arrangement illustrated in Figures 4 and 5, but being universal in the sense that such lamps may be assembled in arrangements like that of Figures 7 and 8, as well as like that of Figure 6. This being the limiting embodiment, the cone to which the plane of the pins 38ª—39ª is tangent has its vertex at infinity, and so is a cylinder, while that of the pins 38ᵇ—39ᵇ has its vertex in the plane of its base, and so is the plane of said pins.

Figures 4 and 5 illustrate the assembly of a pair of lamps, which may be like the lamp 31 of Figures 1 and 2 or the lamp 31ª of Figure 3, or similar lamps in which the contact pins 38ᶜ and 39ᶜ are so arranged that they overlap the adjacent pins of the associated lamps, when assembled as illustrated, rather than engaging said pins, thereby making it possible to use a supporting fixture 41 holding pin-receiving sockets 52, illustrated in detail in Figures 9, 10, and 11, which are relatively thin, that is, only slightly thicker than the length of one of the contact pins. The fixture 41 may be formed in two pieces held together by screws 40, so as to be supported on a central standard or column 44 and have its central portion enlarged to accommodate starting relays 45, and switches 46. If desired, the intermediate portions of the lamps may be supported by bracket members 47 projecting from the enlarged central portion of the member 41, and with their end portions 48 underlying and supportingly embracing the lamps.

Figure 6 illustrates how a series of lamps, such as shown in Figures 1 and 2 or in Figure 3, may be connected by simple sockets 52 between the adjacent or connected ends of associated lamps, providing a lighting arrangement generally sinusoidal in appearance. Figures 7 and 8 illustrate another arrangement in which lamps, such as shown in Figure 3 may be arranged in generally helical configuration.

Figures 9, 10, and 11 illustrate a pair of lamps 31, based as indicated at 37 and operatively connected by a preferred form of socket 52. In the present embodiment, the socket 52 is formed in two identical insulating parts 53 and 54, each part containing complementary pocket portions 55 and 56 holding threaded metal members or nuts 57 and 58 for the reception of bolts (not shown) for connection with a supporting member 59. Each socket portion also has a cavity 61 loosely receiving an insulating block 62 which is in turn grooved and provided with metal liner members 63 and 64 to which power leads 65 and 66 connect. Said liner members are of such size as to snugly receive the contact prongs 38 and 39 of the lamps 31. The blocks 62 are each provided with elongated pockets 67 and 68 for allowing the desired play therein of the liner members of the cooperating block. The insulating portions mentioned may be formed of a suitable known thermosetting resin. The blocks are desirably separated by insulating plates 69 and 71 which serve to cover the block-received portions of the leads 65 and 66. The parts 53 and 54 of each socket, after assembly, may be secured together by hollow rivets 72 and 73.

From the foregoing disclosure, it will be seen that the contact pins 38 and 39 at each end of each lamp are overlappingly received in a socket 52 into which they extend from opposite sides. By virtue of the movable blocks 62 therein, reasonable manufacturing tolerances are allowed for and the lamps after assembly with said sockets may move to a slight extent with respect to one another. Leads are provided for individually delivering power to the associated lamps.

In the embodiment of Figures 12, 13, and 14, we allow for rotation of the contact prongs 38ᵉ and 39ᵉ of lamps 31ᵉ with respect to the base 37ᵉ by mounting said prongs on a plate 74, the ends of which are bifurcated, as indicated at 75 and 76, as by forming the portion carrying the tongue 75 as a separate member 77, held to the main portion 74 by the contact pin 38ᵉ acting as a rivet. The portions 75 and 76 lie on opposite sides of a corresponding flange 78 of the base member 37ᵉ, thereby allowing rotation through 90°, that is, from the position shown in full lines in Figure 14 to that shown in dotted lines. This makes it possible to use the same lamps for making the combinations shown respectively in Figures 4, 6, 7, and 15, the latter figure representing an arrangement of lamps 31ᵉ and sockets 52ᵉ similar to that of Figures 7 and 8, except that the pitch of the helix, as represented by the character $p$, is variable and may be much smaller.

Figure 16 is a wiring diagram showing how the power may be led to a pair of lamps 31, in contrast with the conventional circuit as represented in Figure 4. When the three arm switch 80 is in the position illustrated, neither lamp is energized from the source of power 79. When moved to position 81, one of the lamps, that is, the one at the top of Figure 16 is energized, using the glow relay 82 and ballast coil 83. Upon moving the switch 80 to position 84, the other or bottom lamp 31 is also energized, using the same glow relay 82 for starting, but with the other ballast coil 85. The upper arm of the switch completes the main circuits, using the contact strip 90 when both lamps are energized, the middle and lower switch arms completing the auxiliary circuits.

Referring now to the embodiment of our invention illustrated in Figures 17 to 21, inclusive, there is shown a construction which may be identical with that of Figures 9, 10, and 11, except that the bases 37ᶠ have contact pins 38ᶠ and 39ᶠ which are headed, as indicated at 86, and shorter than the pins 38 and 39 of the preceding embodiments, whereby thickness $t$ of the associated insulating base 52ᶠ may be less than the corresponding dimension of the base 52.

However, the base 52ᶠ of the present embodiment may be generally like the base 52 of the preceding embodiment, except that there are no lead-connected metal liner members, and the pockets 87, 88, 89, and 91, for respectively receiving corresponding pins of the associated lamps 31ᶠ, are formed directly in the insulating movable insulating blocks 62ᶠ and have openings large enough to allow for entry of the enlarged heads 86 of the pins, and lower notches constricted by flanges 92, so that the pins once entered may have their heads lowered behind the constricted portions, where the flanges 92 will prevent withdrawal until corresponding raising thereof, as will be understood.

Associated with the constricted portions of the pockets are spring metal contact members 93, 94, 95, and 96, respectively electrically engaging the pins 38ᶠ and 39ᶠ of the associated lamps when seated in the constricted portions of the pockets which lock them in place, and serving to transmit the appropriate power thereto. The lower portion of each socket, or that beyond the associated lamp bases, may be thickened as indicated at 97 and to allow for secure connection to a supporting member or bracket (not shown) as in the preceding instance. Hollow rivets 72ᶠ and 73ᶠ may serve to connect the socket parts 53ᶠ and 54ᶠ.

In the wiring diagram of Figure 22, we propose to sequentially energize first one, for example the upper lamp 31, and then the other, for example the lower lamp 31, without using a glow relay. When the switch 98, with simultaneously moving upper and lower arms, is in position illustrated, neither lamp is energized from power supply 99. When, however, the switch is moved to position 101, the upper lamp 31 is energized through line 102 and choke coil 103, the circuit being completed by the bridging of lines 104 and 105 by the lower or longer arm of the switch 98. When the switch is moved to position 106, after starting of the upper lamp 31, the lower lamp is also energized through contact strip 107, line 108 and ballast coil 109, the circuit being completed by the bridging of lines 111 and 112 by the lower or longer arm of the switch 98. After the second lamp lights, the auxiliary circuits may be disconnected by moving the switch to the position 113.

From the foregoing, it will be seen that we have provided an arcuate or approximately semicircular discharge lamp, of a desired or fluorescent type, which is believed to be an improvement over the approximately circular fluorescent lamp by virtue of the advantages before enumerated.

Although preferred embodiments of the invention have been disclosed, it will be understood that modifications may be made within the spirit and scope of the appended claims.

We claim:

1. A discharge lamp having an arcuate tubular envelope, a mount at each end thereof, each mount comprising a glass flare terminating in an inwardly-directed press lying in a plane approximately tangent to the axis of said envelope and having support members extending inwardly through, and lying in the plane of, said press, and a filament carried on said support members, said support members emerging from said press in a common plane at an angle to said press plane in the direction of envelope curvature, whereby the supported filament is more nearly centered in the envelope.

2. A discharge lamp having an approximately semi-circular tubular envelope, a mount at each end thereof, each mount comprising a glass flare terminating in an inwardly-directed press lying in a plane approximately tangent to the axis of said envelope and having supports extending through, and lying in the plane of, said press thereof, and a filament carried on said supports, said supports after they emerge from said press extending, in a common plane, at an angle of between about 20° and 30° to said press plane, in the direction of curvature of the envelope, in order to more nearly center the filament.

3. A socket for use with a pair of adjacent ends of discharge lamps, comprising a pair of insulating housing members apertured identically and formed so that when assembled, back to back, the apertures of one are offset with respect to those of the other, for receiving from opposite sides correspondingly positioned contact pins of said lamps, so that said pins overlap in said socket, a pair of plates slidable in said housing members and formed with pockets, the upper portions of which are entered through enlarged openings merging into slots restricted by flanges, whereby headed pins of said associated lamps may be inserted in said enlarged openings and then moved down so that the flanges restricting said slots hold the pins by their heads locked in place with respect to said socket.

4. A base for a discharge lamp formed with a flange for connection with the envelope of said lamp, a peripheral flange projecting inwardly from said envelope-connecting flange, a member with axially opening ends forming bifurcations straddling said inwardly projecting flange to hold said member to said flange while allowing for rotation thereof about the base axis, and contact pins passing through said member, whereby said pins may be rotated about the axis of said base to allow for different assembly patterns with respect to similar bases.

5. A discharge lamp having an arcuate tubular envelope and a base at each end thereof, each base having a pair of contact pins projecting parallel to the axis of the base, the plane of the axes of one pair of pins being tangent to a cone having its axis passing through the center and perpendicular to the plane of the circle which passes centrally through the curved lamp envelope, and the plane of the axes of the other pair of pins being tangent to such a cone inverted with respect to the cone first-mentioned, so that a plurality of lamps may be used in combination and lie base to base, with said pins overlapping.

6. A discharge lamp having an arcuate tubular envelope and a base at each end thereof, each base having a pair of contact pins projecting parallel to the base axis, the plane of the axes of each pair of pins extending at an angle of 45° to the envelope axis.

7. A discharge lamp having an arcuate tubular envelope and a base at each end thereof, each base having a pair of contact pins projecting parallel to the base axis, the plane of the axes of each pair of pins extending at an angle to the envelope axis, and that of the axes of one pair being tangent to a cone having its axis passing through the center and perpendicular to the plane of the circle which passes centrally through the curved lamp envelope, and the plane of the axes of the other pair of pins being tangent to such a cone inverted with respect to the cone first-mentioned, so that a plurality of lamps may be used in combination and lie in the same plane, base to base, with said pins projecting into common base-intermediate sockets, and the pins of one lamp overlapping those of the other, making it possible to use relatively thin sockets.

8. A discharge lamp having an approximately semi-circular tubular envelope and a base at each end thereof, each base having a pair of contact pins projecting parallel to the base axis, the plane of the axes of each pair extending diagonally with respect to the envelope axis, and that of the axes of one pair being tangent to a cone having its axis passing through the center and perpendicular to the plane of the circle which passes centrally through the curved lamp envelope, and the plane of the axes of the other pair of pins being tangent to such a cone inverted with respect to the cone first-mentioned, so that two lamps may be used in combination and lie in the same plane, base to base, with said pins projecting into common base-intermediate sockets, and the pins of one lamp overlapping those of the other, making it possible to use relatively thin sockets.

9. A discharge lamp having an arcuate tubular envelope and a base at each end thereof, each base having a pair of contact pins projecting parallel to the base axis, the plane of the axes of each pair of pins extending at an angle of 45° to the envelope axis, and that of the axes of one pair being tangent to a cone having its axis passing through the center and perpendicular to the plane of the circle which passes centrally through the curved lamp envelope, and the plane of the axes of the other pair of pins being tangent to such a cone inverted with respect to the cone first-mentioned, so that two lamps may be used in combination and lie in the same plane, base to base, with said pins projecting into common base-intermediate sockets, and the pins of one lamp overlapping those of the other, making it possible to use relatively thin sockets.

10. A discharge lamp having an arcuate tubular envelope with a base at each end thereof, each base having a pair of contact pins projecting parallel to the base axis, the plane of the axes of one pair being parallel to the plane of the axes of the other, and that of the axes of one pair being tangent to a cone having its axis passing through the center and perpendicular to the plane of the circle which passes centrally through the curved lamp envelope, and the plane of the axes of the other pair of pins being tangent so such a cone inverted with respect to the cone first-mentioned, so that a plurality of lamps may be used in combination and lie in the same plane, base to base, with said pins projecting into common base-intermediate sockets and the pins of one lamp overlapping those of the other, making it possible to use relatively thin sockets.

11. In combination, a plurality of discharge lamps, each having an arcuate tubular envelope with a base at each end thereof, each base having a pair of contact pins projecting parallel to the base axis, the plane of the axes of each pair of pins extending at an angle to the envelope axis, said lamps being assembled in the same plane, base to base, a socket intermediate each pair of adjacent bases and from which said envelopes extend in opposite directions, and the pins of each base overlapping in the engaged socket those of the adjacent base.

12. In combination, a pair of discharge lamps, each having an approximately semi-circular tubular envelope with a base at each end thereof, each base having a pair of contact pins projecting parallel to the base axis, the plane of the axes of each pair of pins extending at an angle to the envelope axis, said lamps being assembled in the same plane, base to base, a holder intermediate said lamps and provided with a socket portion disposed to connect with each pair of adjacent bases and from which said envelopes extend in opposite directions, and the pins of each base overlapping in the engaged socket portion those of the adjacent base.

13. A discharge lamp having an arcuate tubular envelope and a base at each end thereof, each base having a pair of contact pins projecting parallel to the base axis, the plane of the axes of one pair being tangent to a cone having its axis passing through the center and perpendicular to the plane of the circle which passes centrally through the curved lamp envelope, and the plane of the axes of the other pair of pins being tangent to such a cone inverted with respect to the cone first-mentioned, so that a plurality of lamps may be used in combination and lie in the same plane, base to base, with said pins projecting into common base-intermediate sockets, the ends of said pins being headed so that they may not only overlap, but interlock with respect to said sockets, thereby holding the lamps in assembled relationship.

14. A discharge lamp having an arcuate tubular envelope and a base at each end thereof, each base having a pair of contact pins projecting parallel to the axis of the base, the plane of the axes of one pair being parallel to the plane of the axes of the other and that of the axes of one pair being tangent to a cone having its axis passing through the center and perpendicular to the plane of the circle which passes centrally through the curved lamp envelope, the plane of the axes of the other pair of pins being tangent to such a cone inverted with respect to the cone first-mentioned, so that a plurality of lamps may be used in combination and lie base to base, with said pins overlapping.

15. A discharge lamp having an approximately semicircular tubular envelope and a base at each end thereof, each base having a pair of contact pins projecting parallel to the axis of the base, the plane of the axes of each pair extending diagonally to the envelope axis and that of the axes of one pair of pins being tangent to a cone having its axis passing through the center and perpendicular to the plane of the circle which passes centrally through the curved lamp envelope, and the plane of the axes of the other pair of pins being tangent to such a cone inverted with respect to the cone first mentioned, so that a plurality of lamps will be used in combination and lie base to base, with said pins overlapping.

ALFRED H. LAIDIG.
GEORGE S. EVANS.

References Cited in the file of this patent

UNITED STATES PATENTS

| Number | Name | Date |
|---|---|---|
| 740,585 | O'Brien | Oct. 6, 1903 |
| 1,877,932 | Meyer | Sept. 20, 1932 |
| 1,897,482 | Kenty | Feb. 14, 1933 |
| 1,938,962 | Harris | Dec. 12, 1933 |
| 1,961,708 | Penning | June 5, 1934 |
| 1,974,888 | Barclay | Sept. 25, 1934 |
| 2,097,139 | Wamser | Oct. 26, 1937 |
| 2,130,768 | Kresge | Sept. 20, 1938 |
| 2,117,756 | Douglas | May 17, 1938 |
| 2,134,558 | Howard | Oct. 25, 1938 |
| 2,296,893 | Austin | Sept. 29, 1942 |
| 2,392,661 | Greiner | Jan. 8, 1946 |
| 2,392,785 | Thomas | Jan. 8, 1946 |
| 2,400,381 | Young | May 14, 1946 |
| 2,453,986 | Greiner | Nov. 16, 1948 |
| 2,528,969 | Oppenheimer | Nov. 7, 1950 |

OTHER REFERENCES

Lighting and Lamps, August 1947, pages 58 and 79.